United States Patent
Fleischmann et al.

(10) Patent No.: US 11,322,130 B2
(45) Date of Patent: May 3, 2022

(54) METHOD AND APPARATUS FOR AIRBORNE-SOUND ACOUSTIC MONITORING OF AN EXTERIOR AND/OR AN INTERIOR OF A VEHICLE, VEHICLE AND COMPUTER-READABLE STORAGE MEDIUM

(71) Applicant: Robert Bosch GmbH, Stuttgart (DE)

(72) Inventors: Thomas Fleischmann, Pfullingen (DE); Udo Hermann, Burgstetten (DE); Niko Dorsch, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/054,105

(22) PCT Filed: Mar. 7, 2019

(86) PCT No.: PCT/EP2019/055738
§ 371 (c)(1),
(2) Date: Nov. 9, 2020

(87) PCT Pub. No.: WO2019/214866
PCT Pub. Date: Nov. 14, 2019

(65) Prior Publication Data
US 2021/0304724 A1    Sep. 30, 2021

(30) Foreign Application Priority Data
May 9, 2018 (DE) .................... 10 2018 207 280.9

(51) Int. Cl.
*G10K 11/16* (2006.01)
*G10K 11/178* (2006.01)
(Continued)

(52) U.S. Cl.
CPC .. *G10K 11/17837* (2018.01); *G10K 11/17881* (2018.01); *G10L 21/0216* (2013.01); *H04R 3/005* (2013.01); *G10K 2210/1281* (2013.01)

(58) Field of Classification Search
CPC ...... G10K 11/17837; G10K 2210/1281; G10L 21/0216; H04R 3/005
(Continued)

(56) References Cited

U.S. PATENT DOCUMENTS

2014/0257813 A1* 9/2014 Mortensen ............ G10L 15/02
                                                        704/251
2015/0039303 A1   2/2015 Lesso et al.
(Continued)

FOREIGN PATENT DOCUMENTS

DE          10234611         2/2004

OTHER PUBLICATIONS

International Search Report for Application No. PCT/EP2019/055738 dated May 16, 2019 (English Translation, 2 pages).

*Primary Examiner* — Ammar T Hamid
(74) *Attorney, Agent, or Firm* — Michael Best & Friedrich LLP

(57) ABSTRACT

The invention relates to a method for airborne-sound acoustic monitoring of an exterior and/or an interior of a vehicle, in which at least one microphone (1) is used to convert airborne sound into an electrical signal (S) and to route it for evaluation purposes to a device for voice and/or sound recognition (2). According to the invention, the electrical signal (S) is subjected to a pre-evaluation in a device for trigger detection (3), and detection of a trigger results in the device for voice and/or sound recognition (2) being moved from an inactive or partially active state to a fully active state by means of the device for trigger detection (3). Further, the invention relates to an apparatus for airborne-sound acoustic (Continued)

monitoring of an exterior and/or an interior of a vehicle and to a vehicle having such an apparatus. The subject matter of the invention is also a computer-readable storage medium.

8 Claims, 6 Drawing Sheets

(51) Int. Cl.
*G10L 21/0216* (2013.01)
*H04R 3/00* (2006.01)
*H04B 1/00* (2006.01)

(58) Field of Classification Search
USPC .................................................. 381/71.4, 86
See application file for complete search history.

(56) References Cited

U.S. PATENT DOCUMENTS

2015/0221307 A1* 8/2015 Shah ...................... G06F 1/3293
704/253
2016/0253997 A1* 9/2016 Kerr ......................... G10L 15/28
381/110

* cited by examiner

METHOD AND APPARATUS FOR AIRBORNE-SOUND ACOUSTIC MONITORING OF AN EXTERIOR AND/OR AN INTERIOR OF A VEHICLE, VEHICLE AND COMPUTER-READABLE STORAGE MEDIUM

BACKGROUND OF THE INVENTION

The invention relates to a method for airborne-sound acoustic monitoring of an exterior and/or an interior of a vehicle. Furthermore, the invention relates to an apparatus for airborne-sound acoustic monitoring of an exterior and/or an interior of a vehicle, a vehicle comprising such an apparatus, and a computer-readable storage medium on which a program comprising programming code is stored for carrying out the method.

Modern assistance systems of vehicles require a large amount of information which relates to the vehicle itself or the environment of the vehicle. Vehicles comprising such assistance systems are therefore generally equipped with devices which monitor the exterior and/or interior of the vehicle optically and/or acoustically.

The unexamined patent application DE 102 34 611 A1 discloses, for example, a method for monitoring the environment of a motor vehicle, in which ambient noise is detected and evaluated. The ambient noise acts as an information source for analyzing the situation in the vicinity of the motor vehicle. When carrying out the method, a driver information system is used which is equipped with at least one microphone and means for evaluating the acoustic signals detected by the microphone.

Regardless of whether the evaluation of the data collected by the microphone is used for informing the driver or operating an assistance system, safety-related data must be continuously gathered. This means that the devices used must be continuously activated, at least during the operation of the vehicle. This entails high power consumption.

SUMMARY OF THE INVENTION

The object of the present invention is therefore to specify a method and an apparatus for airborne-sound acoustic monitoring of an exterior and/or an interior of a vehicle, by means of which the power consumption can be reduced.

In order to achieve this objective, the method having the features of claim 1 and the apparatus having the features of claim 7 are specified. Advantageous refinements can be found in the respective subclaims. In addition, a vehicle comprising an apparatus according to the present invention and a computer-readable storage medium are proposed.

In the method for airborne-sound acoustic monitoring of an exterior and/or an interior of a vehicle, airborne sound is converted to an electrical signal S with the aid of at least one microphone, and is conducted to a device for speed and/or noise detection for evaluation. According to the present invention, the electrical signal S is subjected to a pre-evaluation in a device for trigger detection, and if a trigger is detected, the device for speech and/or noise detection is brought from an inactive or partially active state into a fully active state with the aid of the device for trigger detection. In addition, this means that the device for speech and/or noise detection can be put into an inactive or partially inactive state. For example, the device for speech and/or noise evaluation can be operated in a standby mode until the device for trigger detection detects a trigger. Only then is the device for speech and/or noise detection brought into a fully active operating mode in order to carry out a detailed evaluation of the signal.

By putting the device for speech and/or noise detection into an inactive or partially inactive state, power consumption can be considerably reduced. At the same time, by means of the device for trigger detection, it is ensured that safety-related data are collected. Although power is also required for the pre-evaluation by the device for trigger detection, the power consumption is comparatively low since the device for trigger detection only carries out a limited evaluation. The method according to the present invention thus enables energy-efficient speech and/or noise detection. Any noise, a word, or a word sequence can be used as a trigger. In addition, multiple triggers and/or certain frequency ranges can be used as triggers which result in an activation of the device for speech and/or noise detection.

Advantageously, the electrical signal S is amplified before it is conducted to the device for speech and/or noise detection for evaluation. The accuracy of the evaluation can thereby be increased. For this purpose, a preamplifier is preferably upstream of the device for speech and/or noise detection.

Furthermore, it is proposed that the electrical signal S is amplified before it is conducted to the device for trigger detection for pre-evaluation. The accuracy of the pre-evaluation can thereby be increased.

If multiple microphones are available, the method for airborne-sound acoustic monitoring can be carried out in such a way that at least one additional microphone is brought from an inactive or partially active state into a fully active state when a trigger is detected. Thus, not all available microphones have to be continuously activated or fully activated. The power consumption can thereby be further decreased.

For detecting a trigger, for example, it may be sufficient that only a single one of multiple microphones is active or at least partially active in order to convert airborne sound into an electrical signal which is then is subjected to a pre-evaluation with the aid of the device for trigger detection. If a trigger is detected, at least one additional microphone is activated in addition to the device for speech and/or noise detection. The data density provided to the device for speech and/or noise detection can thereby be increased, such that the accuracy of the evaluation further increases.

According to one preferred embodiment of the present invention, a microphone comprising an integrated device for trigger detection is used. This means that the pre-evaluation of the electrical signal takes place in the microphone. Accordingly, activating the devices by means of the microphone may be effectuated via a single signal line.

Alternatively or in addition, it is provided that a microphone is used comprising an integrated preamplifier for signal amplification. It is thereby possible to achieve a particularly compact arrangement.

If at least the device for trigger detection is integrated into the microphone, a common signal output of the microphone can be used for conducting the electrical signal S, as well as an additional electrical signal $S_T$ which has been generated with the aid of the device for trigger detection, to the device for speech and/or noise detection. This means that a conventional microphone having a signal output can be used. Since the device for speech and/or noise detection must first be put into a fully active state for evaluating the electrical signal S, it is proposed that the electrical signal S is superimposed by the additional electrical signal $S_T$ which acts to activate the device for speech and/or noise detection when a trigger is detected.

Alternatively, it is proposed that the electrical signal S and an additional electrical signal $S_T$ generated with the aid of the device for trigger detection are conducted to the device for speech and/or noise detection via separate signal outputs of the microphone. In this case, a microphone is used which comprises at least two signal outputs.

Preferably, the method is carried out according to control unit in which a program comprising corresponding programming code is stored. The method can therefore be automated such that the driver of the vehicle does not have to intervene. This is in particular advantageous if the speech and/or noise detection acts as an information source for an assistance system of the vehicle. In this context, it furthermore proves to be advantageous if at least one microphone is an external microphone which acoustically monitors the exterior space of the vehicle via airborne sound.

The apparatus proposed in addition for airborne-sound acoustic monitoring of an exterior and/or an interior of a vehicle comprises at least one microphone for converting airborne sound into an electrical signal S, and a device for speech and/or noise detection for evaluating the electrical signal S. Furthermore, the apparatus comprises a device for trigger detection which is used for pre-evaluating the electrical signal S and for activating the device for speech and/or noise detection if a trigger is detected. Accordingly, the apparatus is in particular suitable for carrying out the method according to the present invention. In other words, the apparatus can be operated in a particularly energy-efficient manner, and it is possible to reduce the power consumption.

According to a preferred embodiment of the apparatus according to the present invention, the device for trigger detection and/or a preamplifier are integrated into the microphone. It is thereby possible to achieve a compact arrangement. The microphone requires at least one signal output in order to conduct the electrical signal S and a further electrical signal $S_T$ of the device for trigger detection to the device for speech and/or noise detection. Preferably, however, the microphone comprises at least two signal outputs, such that the signals S and $S_T$ can be conducted to the device for speech and/or noise detection via separate signal outputs.

Since the proposed device is used for airborne-sound acoustic monitoring of an exterior and/or interior space, furthermore, a vehicle is proposed comprising such an apparatus and a control unit, according to which the method according to the present invention is carried out. For this purpose, a program comprising corresponding programming code is stored in the control unit.

In addition, a computer-readable storage medium is claimed, on which a program is stored comprising programming code which carries out the method according to the present invention, if the program runs on a computer.

BRIEF DESCRIPTION OF THE DRAWINGS

Preferred embodiments of the present invention will be described in greater detail with the aid of the attached drawings. The following are depicted.

DETAILED DESCRIPTION

Figure 1:
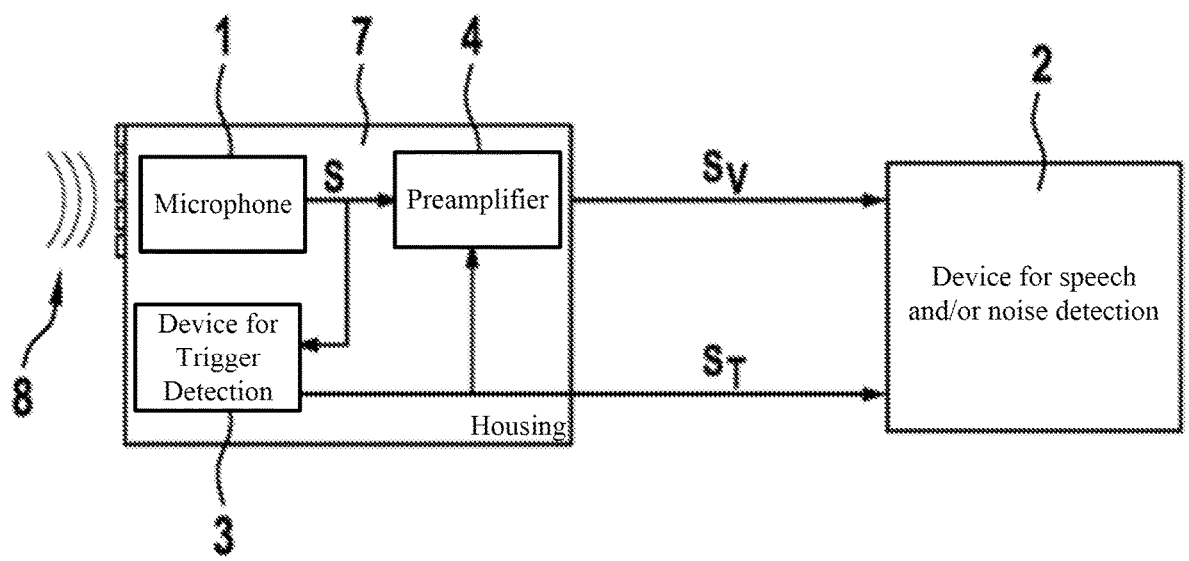
FIG. 1: a schematic representation of an apparatus according to the present invention, according to a first preferred embodiment.

FIG. 1 depicts an apparatus for airborne-sound acoustic monitoring of an exterior and/or an interior of a vehicle, which comprises a microphone 1 comprising a housing 7 into which a device for trigger detection 3 and a preamplifier 4 are integrated. When sound waves 8 strike the microphone 1, the microphone 1 converts them into an electrical signal S which is conducted to the device for trigger detection 3 and to the preamplifier 4. In the device for trigger detection 3, the signal S is subjected to a pre-evaluation. If a trigger is detected, the device for trigger detection 3 conducts a signal $S_T$ to a device for speech and/or noise detection 2 which is connected to the microphone 1, in order to carry out a detailed evaluation of the signal S. However, the device for speech and/or noise detection 2 is deactivated until the signal $S_T$ reaches it. Only then is the device for speech and/or noise detection capable of evaluating the signal S or the signal Sy amplified with the aid of the preamplifier 4.

Figure 2:
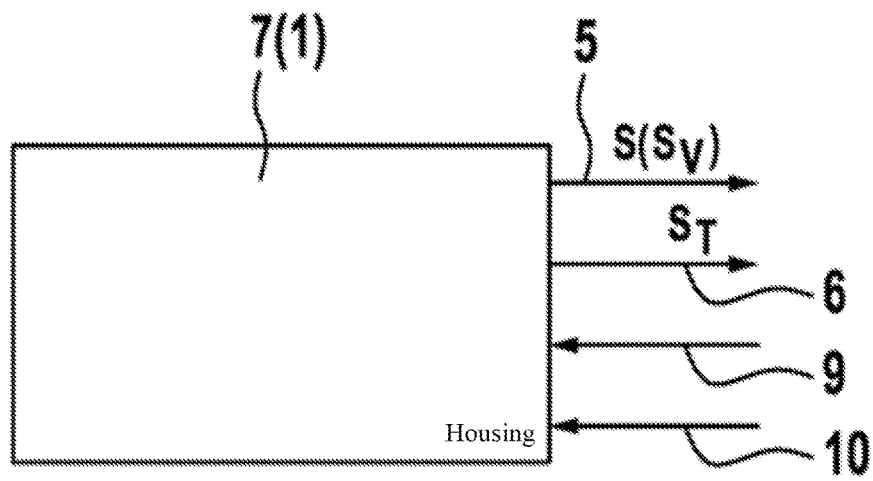
FIG. 2: a schematic representation of a microphone for an apparatus according to the present invention.

In order to conduct the signals S or $S_V$ and $S_T$ separately to the device for speech and/or noise detection 2, the microphone 1 may have two signal outputs 5, 6, as depicted by way of example in FIG. 2. The signal S or $S_V$ then leaves the microphone 1 via the signal output 5, while the signal $S_T$ is conducted via the signal output 6 to the device for speech and/or noise detection 2. In addition, the microphone 1 requires at least one input 9, 10 for supplying power, wherein the second input 10 presently depicted in FIG. 2 acts as a ground terminal.

Figure 3:
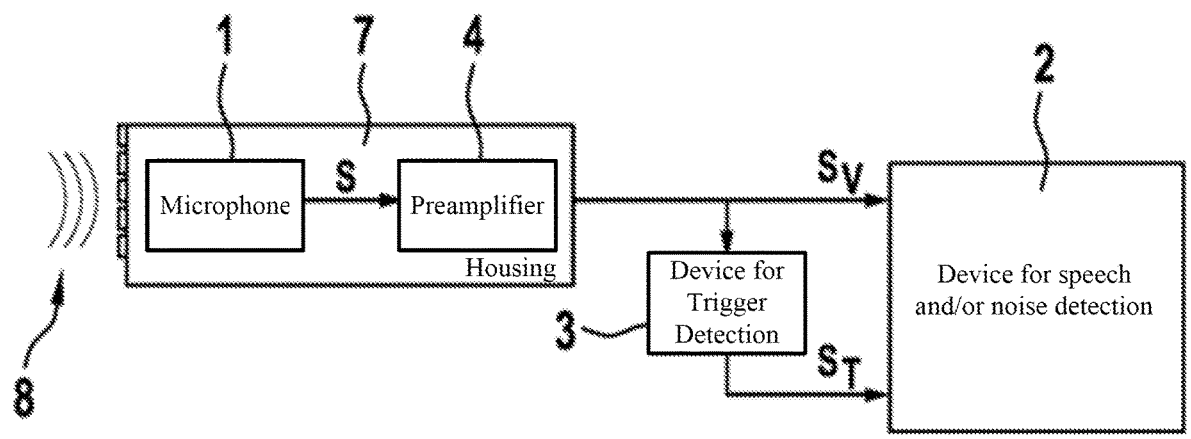
FIG. 3: a schematic representation of an apparatus according to the present invention, according to a second preferred embodiment.

A modification of the embodiment of FIG. 1 is depicted in FIG. 3. Here, only the preamplifier 4 is integrated into the housing 7 of the microphone 1. The device for trigger detection 3 is arranged outside the housing 7. In addition, the circuit is chosen in such a way that the device for trigger detection 3 receives the amplified signal $S_V$.

Figure 4:
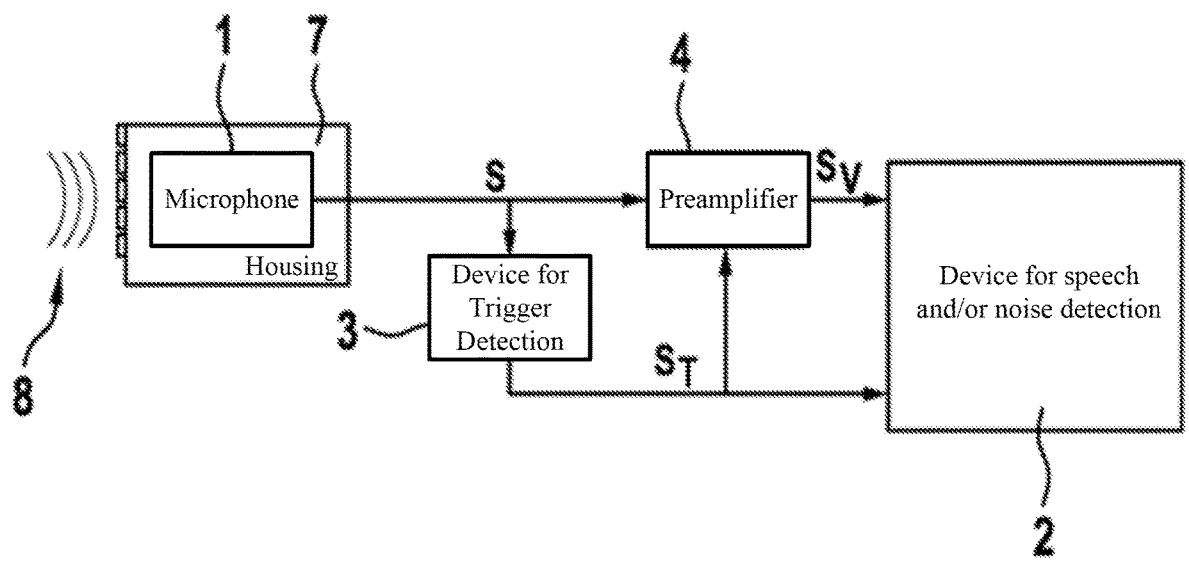
FIG. 4: a schematic representation of an apparatus according to the present invention, according to a third preferred embodiment.

FIG. 4 depicts a further modification. Here, the preamplifier 4 and the device for trigger detection 3 are both arranged outside the housing 7 and connected in such a way that the signal S is conducted unamplified to the device for trigger detection 3, but amplified to the device for speech and/or noise detection 2.

Figure 5:
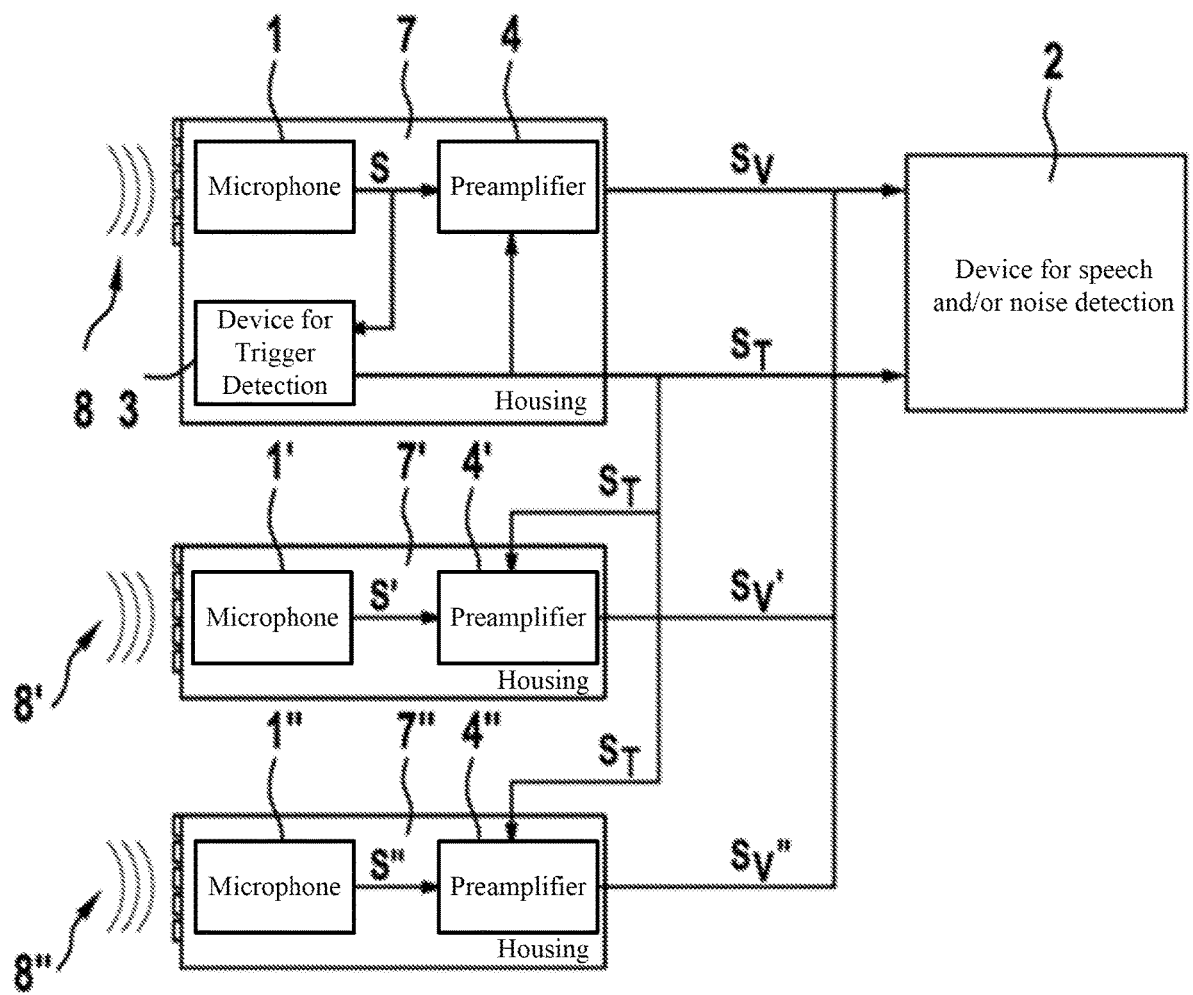
FIG. 5: a schematic representation of an apparatus according to the present invention, according to a fourth preferred embodiment.
Figure 6:
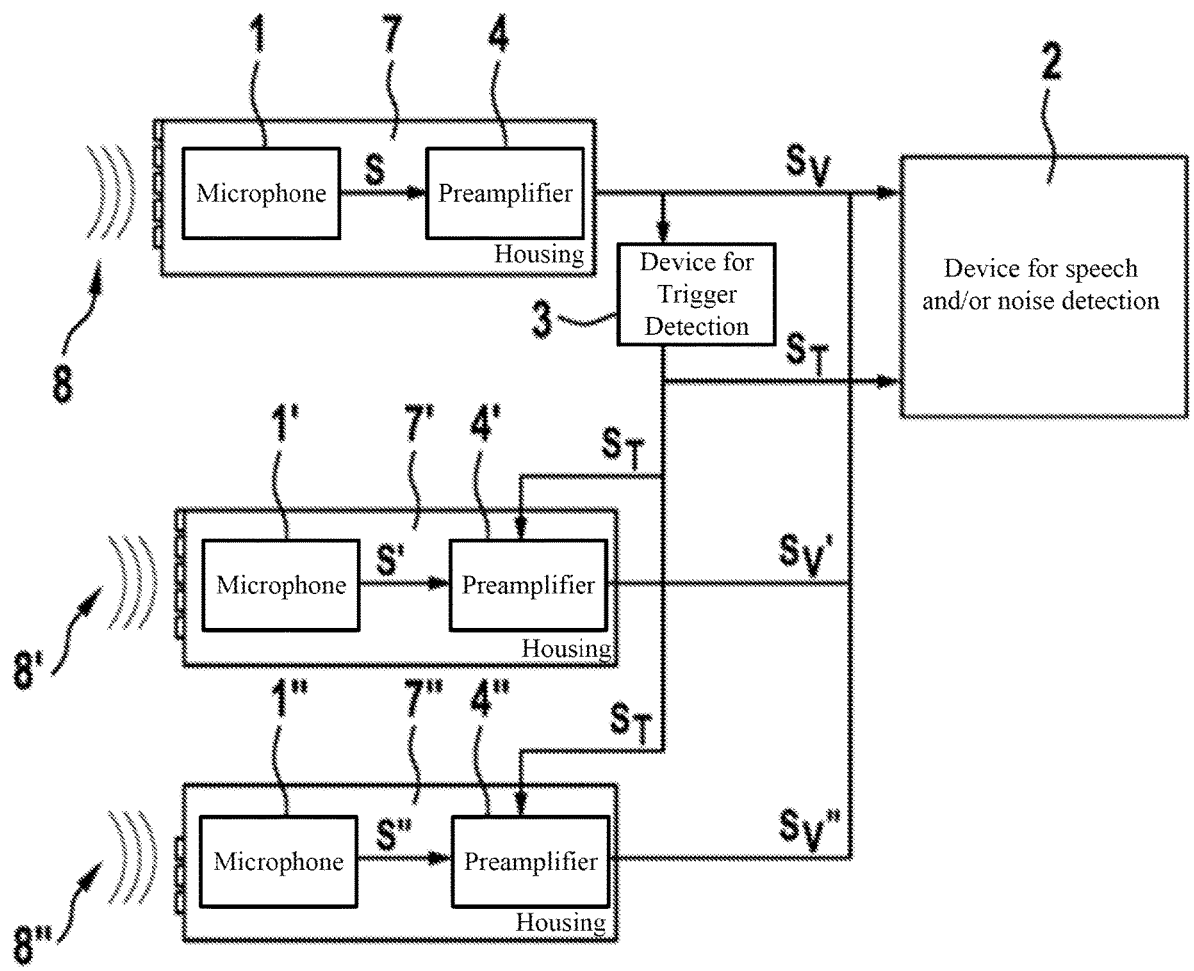
FIG. 6: a schematic representation of an apparatus according to the present invention, according to a fifth preferred embodiment.

FIGS. 5 and 6 depict further embodiments of the apparatus according to the present invention, wherein the apparatuses respectively comprise multiple microphones 1, 1', 1". In addition, a preamplifier 4, 4' 4" is integrated into each housing 7, 7', 7" of the microphones 1, 1', 1" in order to amplify the signal S, S', S".

As depicted by way of example in FIG. 5, the device for trigger detection 3 can also be integrated into a microphone 1. Said microphone is then continuously activated in order, with the aid of the device for trigger detection 3, to detect when an activation of the remaining microphones 1', 1" and the device for speech and/or noise detection 2 is required. When the remaining microphones 1', 1" are activated, additional sound waves 8', 8" can be detected and converted into electrical signals S, S', S" and amplified, such that the device for speech and/or noise detection receives a plurality of amplified signals $S_V$, $S_V'$, $S_V''$ which increase the accuracy of the evaluation.

While the device for trigger detection 3 is integrated into the housing 7 of the microphone 1 in the exemplary embodiment of FIG. 5, the exemplary embodiment of FIG. 6 comprises a separate device for trigger detection 3.

The invention claimed is:

1. A method for airborne-sound acoustic monitoring of an exterior and/or an interior of a vehicle, the method comprising:
  converting airborne sound into an electrical signal (S) with the aid of at least one microphone (1), the microphone (1) integrated with a trigger detection device (3);
  pre-evaluating the electrical signal (S) in the trigger detection device (3);
  conducting the electrical signal (S) to a speech and/or noise detection device (2) for evaluation after pre-evaluating the electrical signal (S) in the trigger detection device (3),
  in response to detecting a trigger output from the trigger detection device (3), bringing the speech and/or noise detection device (2) from an inactive or partially active state into a fully active state;
  wherein an additional electrical signal ($S_T$) is conducted to at least one additional microphone (1), and wherein, in response to receiving the additional electrical signal ($S_T$), the at least one additional microphone (1) is brought from an inactive or partially active state into a fully active state.

2. The method as claimed in claim 1, wherein the electrical signal (S) is amplified before it is conducted to the speech and/or noise detection device (2) for evaluation.

3. The method as claimed in claim 1, wherein the electrical signal (S) is amplified before it is conducted to the trigger detection device (3) for pre-evaluation.

4. The method as claimed in claim 1, further comprising using a microphone (1) having an integrated preamplifier (4).

5. The method as claimed in claim 1, wherein the electrical signal (S) and an additional electrical signal ($S_T$) generated with the aid of the trigger detection device (3) are conducted via a common signal output (5) of the microphone (1) to the speech and/or noise detection device (2), wherein the electrical signal (S) is superimposed by the additional electrical signal ($S_T$).

6. The method as claimed in claim 1, wherein the electrical signal (S) and an additional electrical signal ($S_T$) generated with the aid of the trigger detection device (3) are conducted to the speech and/or noise detection device (2) via separate signal outputs (5, 6) of the microphone (1).

7. An apparatus for airborne-sound acoustic monitoring of an exterior and/or an interior of a vehicle, the apparatus comprising:
  at least one microphone (1) for converting airborne sound into an electrical signal (S),
  a speech and/or noise detection device (2) for evaluating the electrical signal (S), and
  a device for trigger detection device (3) integrated with the microphone (1) and configured to pre-evaluate the electrical signal (S) and activate the speech and/or noise detection device (2) when a trigger is detected,
  wherein the trigger detection device (3) is configured to conduct an additional electrical signal ($S_T$) to at least one additional microphone (1), and wherein, in response to receiving the additional electrical signal ($S_T$), the at least one additional microphone (1) is brought from an inactive or partially active state into a fully active state.

8. The apparatus as claimed in claim 7, wherein a preamplifier (4) is integrated into the microphone (1).

* * * * *